Patented Apr. 18, 1933

1,904,721

UNITED STATES PATENT OFFICE

DAVID ALEXANDER WHYTE FAIRWEATHER, OF FALKIRK, AND JOHN THOMAS, OF POLMONT, SCOTLAND, ASSIGNORS TO IMPERIAL CHEMICAL INDUSTRIES LIMITED, A CORPORATION OF GREAT BRITAIN

MANUFACTURE OF SULPHURIC ESTERS OF ANTHRAHYDROQUINONES

No Drawing. Application filed March 23, 1931, Serial No. 524,763, and in Great Britain March 25, 1930.

This invention relates to the manufacture of sulphuric esters of anthrahydroquinones, and it comprises a process wherein ammonia and alkylamines are reacted with disulphuric esters of 1-halogenohydroanthraquinone-2-carboxylic acid and its esters, the said disulphuric esters being obtained, if desired, by treating the corresponding halogenohydroanthraquinone carboxylic acid or its ester with zinc dust, pyridine and pyridine-sulphuric anhydride; and it further comprises the products so produced particularly the amino and alkylamino derivatives of the sulphuric esters of anthrahydroquinones.

We have found that new and valuable amino and alkylamino derivatives of disulphuric esters of anthrahydroquinone-2-carboxylic acid compounds having the probable formula:

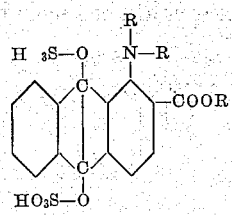

wherein R represents a hydrogen or an alkyl group may be produced by reacting amino compounds having the following structural formula:

with the disulphuric esters of 1-halogenoanthrahydroquinone-2-carboxylic acid and its esters, having the probable formula:

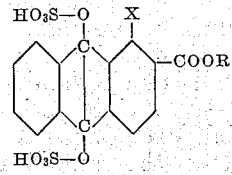

wherein X represents a halogen, such as chlorine or bromine.

The disulphuric ester used in the above process may be prepared from the corresponding 1-halogenoanthraquinone carboxylic acid or its ester by treatment with zinc dust, pyridine and pyridine sulphuric anhydride. The disulphuric ester compound so produced may be converted into the amino and alkylamino compound of the type given ante by heating it with ammonia, or primary and secondary alkylamines. For instance the disulphuric ester of 1-halogenoanthrahydroquinones-2-carboxylic acid may be mixed with aqueous solutions of ammonia or the amine and the mixture boiled until reaction and condensation are effected. The reaction and condensation may be advantageously effected in the presence of an acid absorber such as copper acetate or other copper salt.

Our new amino- and alkylamino-derivatives may be diazotized and coupled with phenols and like coupling components to give valuable azo compounds. They are valuable in the preparation of dyestuffs or intermediates. For instance, they may be diazotized and coupled by the method described in copending U. S. applications 423,-179 and 426,417.

The following examples illustrate our invention as applied to the production of amino and methylamino derivatives, but it will be understood that these are by no means limitative. In the examples the parts are parts by weight.

Example 1

20 parts of 1-chloranthraquinone-2-carboxylic acid are mixed with 60 parts of pyridine sulphur trioxide and 100 parts of pyridine. The mixture is raised in temperature to 90° C. and 16 parts of zinc dust slowly added, after which the melt is kept at 90° C. with stirring for 40 minutes. It is then steam distilled in aqueous solution of 45 parts of sodium carbonate until the pyridine is removed and filtered. The solution so obtained is brown and has a blue fluorescence in dilute solution.

The solution of the ester salt so obtained is evaporated down to about 250 parts and boiled under a reflux condenser with 50 parts of ammonia liquor (about 0.88 s. g.) and 1.25 parts of cupric acetate. The colour of the liquor gradually changes to red and the process appears to be complete after 2 hours. The ester salt which appears to be the ester salt of 1-amino-9:10-anthrahydroquinone-2-carboxylic acid, may be isolated if desired by the usual methods, or the solution may be used directly for the preparation of dyestuffs or intermediates, for instance, by diazotization and coupling by the methods described in co-pending U. S. applications Nos. 423,179 and 426,417.

*Example 2*

This is similar to Example 1, except that the solution of the ester salt after evaporation, is boiled with 100 parts of 50% methylamine and copper acetate instead of with ammonia liquor and copper acetate.

*Example 3*

20 parts of 1-chlor-2-carboxyanthraquinone are mixed with 50 parts of pyridine sulphuric anhydride and 100 parts of pyridine and then 16 parts of zinc dust gradually added at 80–85° C. The melt is then maintained at 80–85° C. for one hour and steam distilled with 40 parts of sodium carbonate. After filtering off the zinc residues the filtrates are acidified with acetic acid, whereupon any unchanged chlorcarboxylic acid is precipitated and may be filtered off. The solution which weighs approximately 250 parts, is treated for 5 hours at the boil, with 50 parts of ammonium liquor and 1 part of cupric acetate.

The dark brown solution is cooled and acidified with hydrochloric acid and a brown sparingly soluble by-product is removed by filtration. The filtrate is of a light brown colour with a green fluorescence and apparently contains the disulphuric acid ester salt of 1-aminoanthraquinone-2-carboxylic acid. It diazotizes to a red-brown solution which can be coupled with phenols.

In each of the foregoing examples the 1-chloroanthraquinone-2-carboxylic acid may be replaced by the equivalent quantity of 1-bromoanthraquinone-2-carboxylic acid, or of an alkyl ester of one of these acids. The products obtained in all cases have the general formula (as free acid ester):

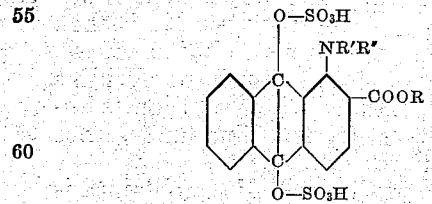

where each of the letters R, R′ and R″ represents either hydrogen or alkyl.

It will be seen that our invention provides a new and convenient method for the manufacture of sulphuric esters of this general formula without the necessity of making acylamino-compounds and subsequently hydrolyzing them.

As many apparently widely different embodiments of this invention may be made without departing from the spirit and scope thereof, it is to be understood that we do not limit ourselves to the specific embodiments thereof except as defined in the appended claims.

We claim:

1. In the manufacture of disulphuric esters having in the form of the free acid the probable formula:

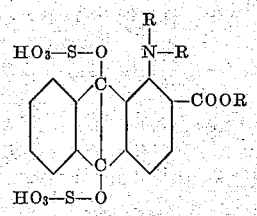

wherein R represents hydrogen or an alkyl group, the step which comprises reacting an amino compound having the probable formula:

wherein R represents hydrogen or an alkyl group, with a disulphuric ester having in the form of the free acid the probable formula:

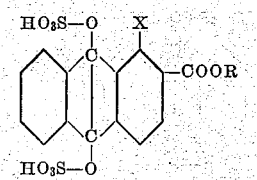

wherein X represents a halogen and R represents hydrogen or an alkyl group.

2. The process of claim 1 in which said reaction is effected in an aqueous medium in the presence of copper acetate as an acid absorber.

3. The process of claim 1 in which the reaction is effected by heating said reactants in an aqueous solution in the presence of a copper salt.

4. The process of claim 1 in which said amino compound is ammonia.

5. The process of claim 1 in which said amino compound is methylamine.

6. The process of claim 1 in which said halogenoanthrahydroquinone compound is a chloro compound, the said X representing chlorine.

7. The process of claim 1 in which said halogenoanthrahydroquinone compound is 1-chloranthrahydroquinone-2-carboxylic acid.

8. In the manufacture of disulphuric esters having in the form of the free acid the probable formula:

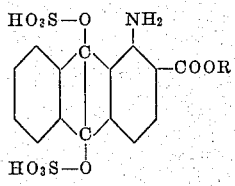

wherein R represents hydrogen or an alkyl group, the step which comprises mixing together an aqueous solution of 1-chloroanthraquinone-2-carboxylic acid, ammonia and a small amount of cupric acetate, boiling the aqueous mixture thus obtained under reflux until reaction and condensation are effected, and then isolating the disulphuric ester salt of 1-amino-9:10-anthraquinone-2-carboxylic acid.

9. In the manufacture of disulphuric esters having in the form of the free acid the probable formula:

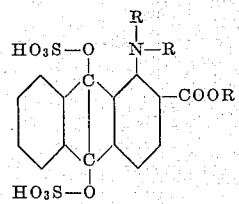

wherein R represents hydrogen or an alkyl group, the process which comprises reacting a 1-halogeno-2-carboxyanthraquinone compound having the probable formula:

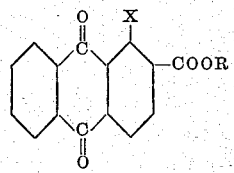

wherein X represents halogen and R represents an alkyl group with pyridine sulphuric anhydride, pyridine and zinc, and then reacting the disulphuric ester of 1-halogenoanthraquinone-2-carboxylic acid compound thus obtained with an amino compound having the probable formula:

wherein R represents hydrogen or an alkyl group.

10. The process of claim 9 wherein said 1-halogeno-2-carboxyanthraquinone compound is 1-chloro-2-carboxyanthraquinone.

11. In the manufacture of disulphuric esters having in the form of the free acid the probable formula:

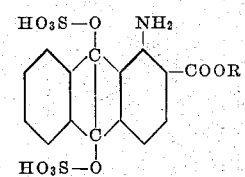

wherein R represents hydrogen or an alkyl group, the process which comprises mixing together 1-chloro-2-carboxyanthraquinone-pyridine sulphuric anhydride, pyridine and zinc dust, heating the mixture to between 80 to 90° C. until reaction is effected, steam distilling the reaction mixture thus obtained in an aqueous solution of sodium carbonate to remove the pyridine, filtering the aqueous solution thus obtained to remove zinc residues and other insolubles, forming an aqueous mixture of the disulphuric ester compound thus obtained, ammonia and copper acetate, heating the aqueous mixture thus obtained until reaction and condensation are effected and then recovering the disulphuric acid ester salt of 1-aminoanthrahydroquinone-2-carboxylic acid thus obtained.

12. The process of claim 11 in which after the zinc residues are removed the filtrate is acidified with acetic acid and any precipitated unchanged chloro-carboxylic acid is filtered off.

13. The process of claim 11 in which after the amino derivative is formed by the reaction of the ammonia and disulphuric ester compound, the solution is acidified with hydrochloric acid and the acidified solution filtered to remove sparingly soluble byproducts, thus obtaining a filtrate having a light brown color with a green fluorescence.

14. In the manufacture of disulphuric esters having in the form of the free acid the probable formula:

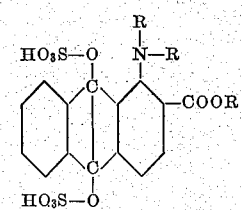

wherein R represents hydrogen or an alkyl group, the step which comprises reacting a 1-halogenoanthraquinone-2-carboxylic acid having the probable formula:

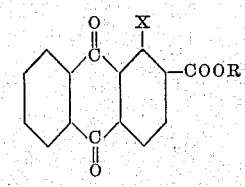

wherein X represents a halogen and R represents hydrogen or an alkyl group, with pyridine-sulphuric anhydride, pyridine and zinc dust, and recovering the disulphuric ester of 1-halogenoanthrahydroquinone-2-carboxylic acid thus produced.

15. As products useful in the production of dyes and intermediates, amino and alkyl-amino derivatives of sulphuric esters of anthrahydroquinones having the probable formula:

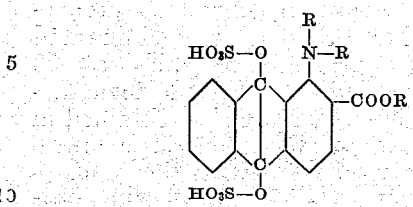

wherein R represents hydrogen or an alkyl group, said esters forming light colored aqueous solutions showing a green fluorescence.

16. As a product, 1-methylamino-9:10-anthrahydroquinone-2-carboxylic acid-disulphuric ester, said ester being soluble in water and giving light colored solutions.

17. As a product, useful in the production of dyestuffs and intermediates, 1-amino-9:10-anthrahydroquinone-2-carboxylic disulphuric ester, said ester being soluble in water, giving light colored solutions having a green fluoresence, and being capable of diazotization and coupling with phenols.

In testimony whereof we affix our signatures.

D. A. W. FAIRWEATHER.
JOHN THOMAS.